US011312354B2

(12) United States Patent
Honkomp

(10) Patent No.: US 11,312,354 B2
(45) Date of Patent: Apr. 26, 2022

(54) TORQUE VECTORING HAVING AUTOMATIC YAW TORQUE EQUALIZATION

(71) Applicant: AUDI AG, Ingolstadt (DE)

(72) Inventor: Franz Honkomp, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 217 days.

(21) Appl. No.: 16/794,475

(22) Filed: Feb. 19, 2020

(65) Prior Publication Data

US 2020/0290589 A1  Sep. 17, 2020

(30) Foreign Application Priority Data

Mar. 13, 2019  (DE) ............... 10 2019 203 388.1

(51) Int. Cl.
*B60W 10/20* (2006.01)
*B60K 1/02* (2006.01)
*B62D 5/04* (2006.01)

(52) U.S. Cl.
CPC ............ *B60W 10/20* (2013.01); *B60K 1/02* (2013.01); *B60W 2520/105* (2013.01); *B60W 2720/14* (2013.01); *B62D 5/0466* (2013.01)

(58) Field of Classification Search
CPC .................................................. B60W 10/20
See application file for complete search history.

(56) References Cited

U.S. PATENT DOCUMENTS

| 9,008,876 B2 * | 4/2015 | Pinto ................. B60T 8/17555 701/22 |
| 10,954,877 B2 * | 3/2021 | Nagashima ........... B60W 10/06 |
| 11,136,021 B1 * | 10/2021 | Funke .................... B62D 17/00 |
| 2013/0144476 A1 | 6/2013 | Pinto et al. |
| 2020/0290589 A1 * | 9/2020 | Honkomp ............... B60L 15/20 |

FOREIGN PATENT DOCUMENTS

| DE | 10 2009 026 994 A1 | 3/2011 |
| DE | 10 2010 012 153 A1 | 9/2011 |
| DE | 10 2012 024 980 A1 | 7/2013 |
| DE | 10 2012 009 364 A1 | 11/2013 |
| DE | 10 2016 202 322 A1 | 8/2016 |

OTHER PUBLICATIONS

Examination Report dated Dec. 3, 2019 in corresponding German application No. 10 2019 203 388.1; 12 pages including Machine-generated English-language translation.

* cited by examiner

*Primary Examiner* — Michael A Berns
(74) *Attorney, Agent, or Firm* — Maier & Maier, PLLC

(57) ABSTRACT

A method and a system for automatic yaw torque equalization (AYTE) in an electrically driven vehicle having wheel-individual torque distribution (torque vectoring drive).

7 Claims, 1 Drawing Sheet

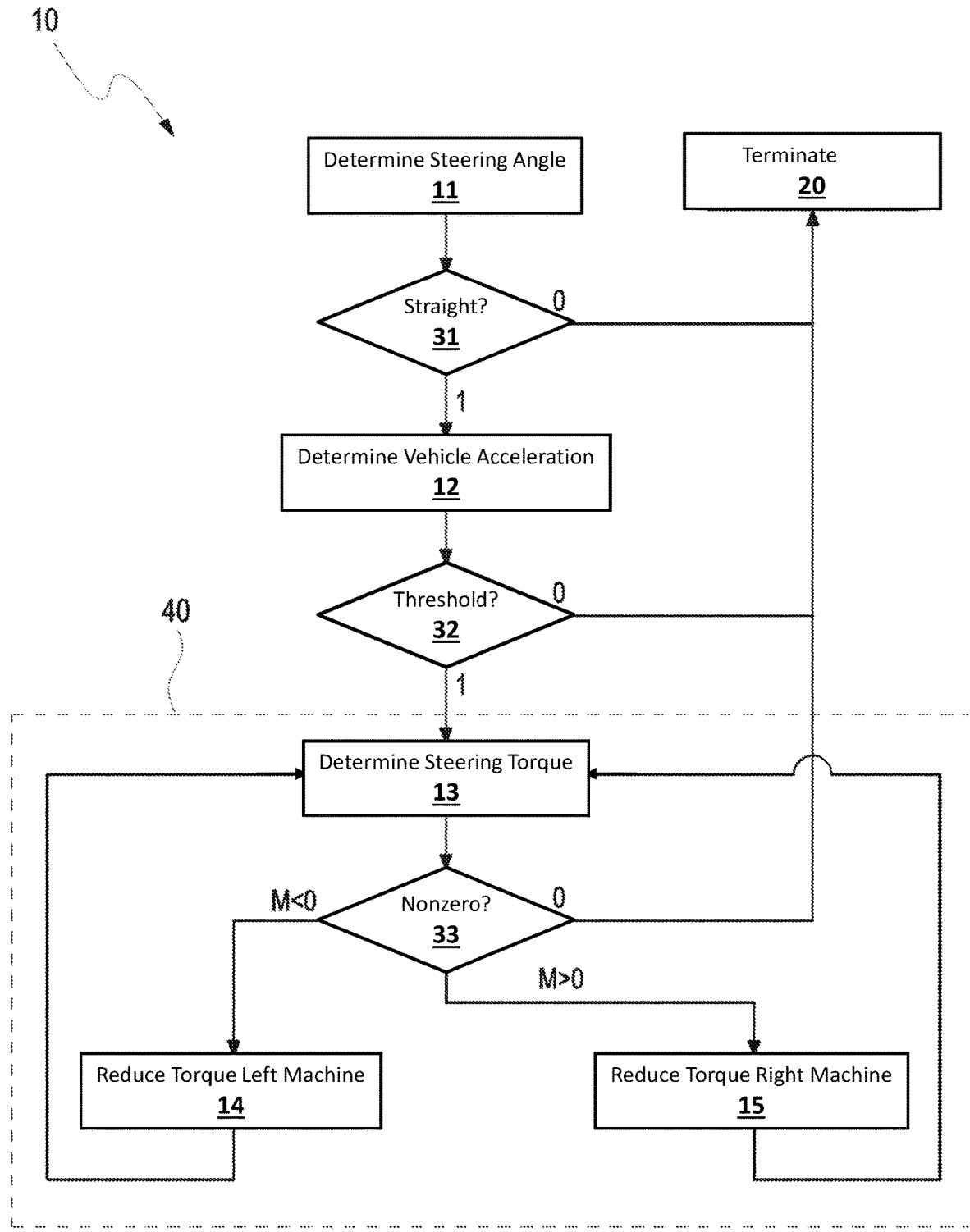

TORQUE VECTORING HAVING AUTOMATIC YAW TORQUE EQUALIZATION

FIELD

The present disclosure relates to a method and a system for automatic yaw torque equalization (AYTE) in an electrically driven vehicle having wheel-individual torque distribution (torque vectoring drive).

BACKGROUND

Torque vectoring drives offer the degree of freedom of demand-based distribution of the drive torque onto the outside and inside wheel when cornering. For electric drives which implement this functionality by way of two separate electric machines, however, the risk exists of inadvertent application of a yaw torque. The cause of this is that the drive torque is not regulated, but rather controlled. Target current values are computed in dependence on electrical parameters, which values are then regulated in a closed current regulating loop. Because of a production-related variation of the electrical input parameters, different actual torques can be placed on the wheels in the case of equal target torque demand for outside and inside wheel when cornering. This is a circumstance particularly for torque vectoring drives which can negatively influence, on the one hand, the safety of vehicle and occupants and, on the other hand, the wear of the tires.

The production-related variation can be counteracted by grading the electric machines into classes after the end-of-line inspection and only installing machines which were assigned a defined class into a torque vectoring drive. Furthermore, the option exists of equalizing the drives to one another by corresponding adaptation of the data of the software models. However, both approaches are time-consuming and costly. Moreover, effects which result in the course of the lifetime of the drive are not taken into consideration in this case.

The present disclosure has the object of providing a simpler method for avoiding undesired yaw torques in an electrically driven vehicle having torque vectoring drive, which can moreover also compensate for changes of the properties of the electric machines over the lifetime of the drive.

DE 10 2009 026 994 A1 relates to a sideslip angle regulator having an active differential. The sideslip angle regulator monitors deviations of an actual sideslip angle in relation to a target sideslip angle and corrects them by an application of a yaw torque by means of a differential.

DE 10 2012 024 980 A1 discloses a method for determining a target curve inclination and a steering angle correction value of a motor vehicle when traveling on a curvy roadway section. A target curve inclination and a steering angle correction value of a motor vehicle when traveling on a curvy roadway section are determined by determining an instantaneous lateral acceleration of the motor vehicle in dependence on an instantaneous velocity of the motor vehicle from sensor data provided by a non-optical sensor system and/or from an instantaneous roadway curvature of the curvy roadway section determined by means of an optical detection system, computing an instantaneous target curve inclination for the motor vehicle from the determined instantaneous lateral acceleration and a modified instantaneous target curve inclination by weighting the computed target curve inclination using a velocity-dependent target curve inclination weighting factor, and determining a steering angle correction value for the motor vehicle in dependence on the computed modified instantaneous target curve inclination and the computed instantaneous roadway curvature.

A steering assistance unit of a vehicle, which is equipped with a steering assistance mechanism and a torque vectoring mechanism for right and left wheels, is known from DE 10 2016 202 322 A1. The steering assistance unit comprises a steering assistance torque controller, which controls a steering assistance torque delivered by the steering assistance mechanism for the driving assistance control; a controller of the difference of right and left brake/drive forces, which controls a brake/drive force differential delivered by the torque vectoring mechanism between the right and left wheels for the steering assistance unit; and a control target value determination unit, which determines a target value of the steering assistance torque and a target value of the brake/drive force difference for the steering assistance on the basis of the steering torque by a driver.

SUMMARY

The method according to the disclosure enables an automatic yaw torque equalization, in which data of steering torque and position sensors of the vehicle steering system are used to eliminate the undesired yaw torque, for example, by adjustment out in a closed regulating loop.

The subject of the disclosure is a method for automatic yaw torque equalization in a vehicle having an electric drive having wheel-individual torque distribution (torque vectoring drive), which comprises at least two electric machines which each drive one wheel of an axle. The disclosure comprises checking during straight-ahead travel of the vehicle whether a nonzero steering torque occurs and in case of an occurring steering torque, adapting the target torque demand at the two electric machines to eliminate the occurring steering torque. In one embodiment, it is additionally checked whether the vehicle acceleration during the straight-ahead travel exceeds a predetermined threshold value, i.e., whether the electric machines generate a significant drive torque, before it is checked whether a nonzero steering torque occurs.

In one embodiment of the method, the drive having wheel-individual torque distribution comprises four electric machines, which each drive one of the wheels of the vehicle. In one embodiment of the method, the electric machines are mounted on the vehicle platform. In one embodiment, the electric machines are central drives, in another embodiment, the electric machines are drives close to the wheels.

If the electric machines of the drive have greatly differing electric properties, different actual torques thus result from an equal target torque demand at the electric machines. During straight-ahead travel using such a set of electric machines, a nonzero steering torque occurs at neutral steering wheel position. The system establishes a vehicle-technology abnormal behavior. The system can establish on the basis of the sign of the steering torque for which of the two electric machines of a drive axle the target value demand has to be reduced to eliminate the steering torque. In one embodiment of the method, in a downstream adaptation loop, the target torque demand of the identified machine is then successively adapted until the steering torque does not apply during straight-ahead travel.

The method according to the disclosure can also establish a change of the properties of the electric machines over the lifetime and adjust out the effect thereof on the straight-ahead travel of the vehicle. Moreover, the method according to the disclosure provides a safety function for the straight-ahead travel of vehicles having electric torque vectoring drives.

The subject matter of the disclosure is also a system for the automatic yaw torque equalization in a vehicle having an electric drive having wheel-individual torque distribution (torque vectoring drive), which comprises at least two electric machines which each drive one wheel of an axle.

The system comprises means for acquiring a steering angle and a steering torque and a control unit, which is configured to place a target torque demand at the at least two electric machines. The control unit is moreover configured for the purpose of receiving and analyzing data on acquired steering angles and steering torques and adapting the target torque demand at the at least two electric machines in such a way that the measured steering torque disappears during straight-ahead travel of the vehicle, i.e., a steering torque of zero occurs at a neutral steering angle.

In one embodiment, the system moreover comprises means for acquiring a vehicle acceleration, for example, an acceleration sensor.

In modern vehicles, in general at least some of the required hardware and software components are already provided. They thus typically comprise steering angle, steering torque, and acceleration sensors. Electrically operated vehicles having torque vectoring drives have a control unit, which individually controls the electric machines and specifies target torques to them.

According to the disclosure, the items of information about steering torque and steering angle have to be relayed via the vehicle network to the control unit. The control unit has to be configured for the purpose of analyzing the items of information about steering torque and steering angle and adapting the target torque demand at the electric machines in such a way that the measured steering torque disappears during straight-ahead travel of the vehicle. In one embodiment, the sequence of the method according to the disclosure is implemented in the control unit in the form of software functions, which modify or adapt the torque demand until the measured steering torque disappears during straight-ahead travel.

The advantages of the method and system according to the disclosure include an improvement of the vehicle safety and time and cost savings in the vehicle production and drive development.

Further advantages and designs of the disclosure result from the description and the appended drawing.

The above-mentioned features and the features still to be explained hereafter are usable not only in the particular specified combination but rather also in other combinations or alone, without leaving the scope of the present disclosure.

BRIEF DESCRIPTION OF THE DRAWING

The disclosure is schematically illustrated on the basis of one embodiment in the drawing and is described further with reference to the drawing. In the FIGURE:

FIG. 1 shows a flow chart of one embodiment of the function for automatic yaw torque equalization (AYTE).

DETAILED DESCRIPTION

FIG. 1 shows a flow chart 10 of one embodiment of the function for automatic yaw torque equalization (AYTE) in a torque vectoring drive having two electric machines.

At the beginning of the method are the ascertainment of the steering angle 11 and the check 31 as to whether the steering angle is neutral, i.e., straight-ahead travel exists. If this is not the case, the termination 20 of the method occurs.

If straight-ahead travel is present, the ascertainment 12 of the vehicle acceleration a and the check 32 as to whether the vehicle acceleration a is greater than a predetermined threshold value follow. If this is not the case, the termination 20 of the method occurs.

If the vehicle acceleration a is greater than the threshold value, i.e., if the electric machines generate a significant drive torque, the ascertainment 13 of the steering torque M and the check 33 as to whether the steering torque M is nonzero follow. If the steering torque M is equal to zero, the end 20 of the method is reached.

If it is established that a nonzero steering torque M is present, an adaptation loop 40 thus begins. If the steering torque M is less than zero, a reduction 14 of the target torque of the left electric machine occurs. If the steering torque M is greater than zero, a reduction 15 of the target torque of the right electric machine occurs. In an alternative embodiment (not shown), the signs of an occurring steering torque are reversed because of a producer-specific orientation. In this case, in the event of a steering torque less than zero, the target torque of the right electric machine is reduced, and in the event of a steering torque greater than zero, the target torque of the left electric machine is reduced.

An ascertainment 13 of the steering torque M is subsequently performed again. This loop 40 is run through until the steering torque M is adjusted out, i.e., has the value zero. A steering torque M of zero means that the actual torques of the electric machines are equal. The ratio of the target torques at which the actual torques of the electric machines are equal is stored and is used as a correction factor in the control of the electric machines.

The invention claimed is:

1. A method for automatic yaw torque equalization in a vehicle having an electric drive having wheel-individual torque distribution, including at least two electric machines, which each drive one wheel of an axle, comprising:
   determining whether a vehicle acceleration exceeds a predetermined threshold;
   if the vehicle acceleration exceeds the predetermined threshold, determining, during a straight-ahead travel of the vehicle in which a steering wheel of the vehicle is in a neutral position, whether a nonzero steering torque occurs; and
   if the nonzero steering torque occurs, adapting, via an adaptation loop, a target torque demand at the two electric machines until the nonzero steering torque is eliminated.

2. The method according to claim 1, wherein the electric drive having wheel-individual torque distribution includes four electric machines, which each drive one wheel of the vehicle.

3. The method according to claim 1, wherein the electric machines are mounted on a vehicle platform.

4. The method according to claim 3, wherein the electric machines are arranged at the wheels.

5. The method according to claim 3, wherein the electric machines are arranged centrally on the vehicle platform.

6. A system for the automatic yaw torque equalization in a vehicle having an electric drive having wheel-individual torque distribution, comprising:
   at least two electric machines, which each drive one wheel of an axle,
   a steering angle sensor and a steering torque sensor, and a control unit, which is configured to provide a target torque demand at the at least two electric machines, wherein the control unit is configured to receive and analyze data on acquired steering angles and steering torques and adapt, via an adaptation loop, the target torque demand at the at least two electric machines until a measured, nonzero steering torque disappears during straight-ahead travel of the vehicle in which a steering wheel of the vehicle is in a neutral position and during an acceleration of the vehicle which exceeds a predetermined threshold.

7. The system according to claim 6, further comprising a vehicle acceleration sensor.

\* \* \* \* \*